United States Patent [19]

Ichikawa et al.

[11] Patent Number: 4,752,117
[45] Date of Patent: Jun. 21, 1988

[54] OBJECTIVE LENS DRIVING DEVICE

[75] Inventors: Atsushi Ichikawa, Ibaraki; Masayuki Abe, Yokohama; Akio Yabe, Kamakura; Hideo Onuki, Yokohama; Shigefumi Hida, Tsuchiura, all of Japan

[73] Assignee: Hitachi, Ltd., Tokyo, Japan

[21] Appl. No.: 922,348

[22] Filed: Oct. 23, 1986

[30] Foreign Application Priority Data

Oct. 23, 1985 [JP] Japan .................. 60-235174
Mar. 7, 1986 [JP] Japan .................. 61-48343

[51] Int. Cl.⁴ .......................... G02B 7/02; G02B 7/11
[52] U.S. Cl. .................................... 350/247; 350/255
[58] Field of Search ........................ 350/247, 255; 369/44-45

[56] References Cited

U.S. PATENT DOCUMENTS

| 4,467,463 | 8/1984 | Yano ................................... 369/45 |
| 4,566,089 | 1/1986 | Kime .................................. 350/255 |
| 4,571,026 | 2/1986 | Maruta ............................... 350/247 |
| 4,596,444 | 6/1986 | Ushida ............................... 350/247 |
| 4,664,476 | 5/1987 | Kasuga .............................. 350/247 |

Primary Examiner—William H. Punter
Attorney, Agent, or Firm—Antonelli, Terry & Wands

[57] ABSTRACT

Disclosed is a device for driving an objective lens of an optical disk apparatus in both the tracking direction and the focusing direction. The device comprises a rocker arm supported rotatably and axially slidably by a supporting shaft and carrying the objective lens on its front end, a pair of first coils disposed on both sides respectively of an end on rear end of the rocker arm remote from the front end carrying the objective lens for driving the objective lens in the tracking direction, and a second coil mounted to the lower surface of the rocker arm for driving the objective lens in the focusing direction. A pair of magnets for producing a magnetic field for driving the objective lens in the focusing direction and a magnetic field for driving the objective lens in the tracking direction are mounted to a pair of yokes erected on both sides of the supporting shaft respectively. Current is supplied to the first coils to produce moments of rotation rotating the rocker arm thereby driving the objective lens in the tracking direction, and current is supplied to the second coil to move the rocker arm in the axial direction of the supporting shaft thereby driving the objective lens in the focusing direction.

15 Claims, 6 Drawing Sheets

OBJECTIVE LENS DRIVING DEVICE

BACKGROUND OF THE INVENTION

1. FIELD OF THE INVENTION

This invention relates to an objective lens driving device for use in an optical disk apparatus or the like.

2. PRIOR ART

An objective lens driving device is known in which an objective lens is mounted on a rocker arm in a relation spaced apart from a shaft supporting the rocker arm, and the rocker arm is provided which means for driving the objective lens in the axial direction of the supporting shaft (the focusing direction) and means for driving the objective lens in the rotating direction of the rocker arm (the tracking direction).

According to the known device, impartation of a driving force to one end of the rocker arm produced a large torque driving the objective lens in the tracking direction, so that the size of the driving means driving the objective lens in the tracking direction can be reduced. However, in this known device, the driving force imparted to the end of the rocker arm (the tracking arm) is not balanced with respect to the supporting shaft. As a result, the rocker arm is urged straight in the direction of the driving force by an amount corresponding to a very narrow gap between the supporting shaft and the cylindrical hole of the rocker arm through which the shaft extends. Thus, the resultant displacement of the objective lens is the sum of the rotating movement and the straightforward movement. When the frequency of the driving force imparted to the end of the rocker arm coincides with the resonance frequency of the supporting shaft, the cylindrical hole portion of the rocker arm collides against the supporting shaft at the resonance frequency of the supporting shaft to cause resonance of the supporting shaft. The resonance of the supporting shaft results in a large displacement of the objective lens in the straightforward moving direction, and this results in a great deviation of the amplitude and phase of the displacement of the objective lens in the tracking direction. Under such a situation, it is difficult to stably drive the objective lens in the tracking direction.

SUMMARY OF THE INVENTION

It is an object of the present invention to provide an objective lens driving device which can stably drive an objective lens in both the tracking direction and the focusing direction.

Another object of the present invention is to provide an objective lens driving device in which a shaft supporting a rocker arm carrying the objective lens is substantially freed from friction and vibration.

Still another object of the present invention is to provide an objective lens driving deice which can improve the accuracy of positioning the objective lens in the tracking direction.

In accordance with one aspect of the present invention, there is provided an objective lens driving device comprising a supporting shaft erected on a base plate, a pair of yokes erected on the base plate on both sides of the supporting shaft in a relation spaced apart from the supporting shaft, a pair of magnets mounted to the yokes respectively, a rocker arm supported by the supporting shaft so as to be rotatable around the axis of the supporting shaft and movable in the axial direction of the supporting shaft, an objective lens mounted on the rocker arm at an end portion which is front relative to the supporting shaft, a pair of first coils disposed on both sides respectively of an end portion of the rocker arm which is rear relative to the supporting shaft so as to drive the objective lens in the rotating direction of the rocker arm, a second coil mounted to the lower surface of the rocker arm with the center of the winding thereof registering substantially with the axis of the supporting shaft so as to drive the objective lens in the axial direction of the supporting shaft, means for supplying current to the pair of the first coils to generate electromagnetic forces in the first coils in directions opposite to each other for producing moments of rotation tending to rotate the rocker arm around the axis of the supporting shaft thereby driving the objective lens in the rotating direction of the rocker arm, and means for supplying current to the second coil to move the rocker arm in the axial direction of the supporting shaft thereby driving the objective lens in the axial direction of the supporting shaft.

DESCRIPTION OF THE PREFERRED EMBODIMENTS

Preferred embodiments of the present invention will now be described in detail with reference to the drawings.

Figure 1:
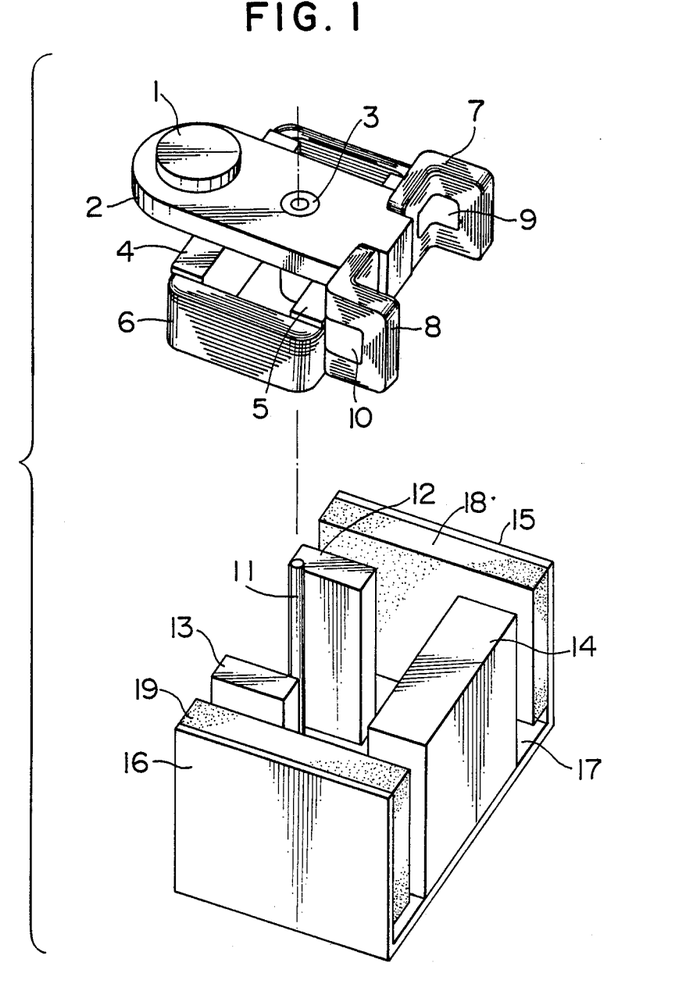
FIG. 1 is an exploded perspective view of an embodiment of the objective lens driving device of the present invention.
Figure 2:
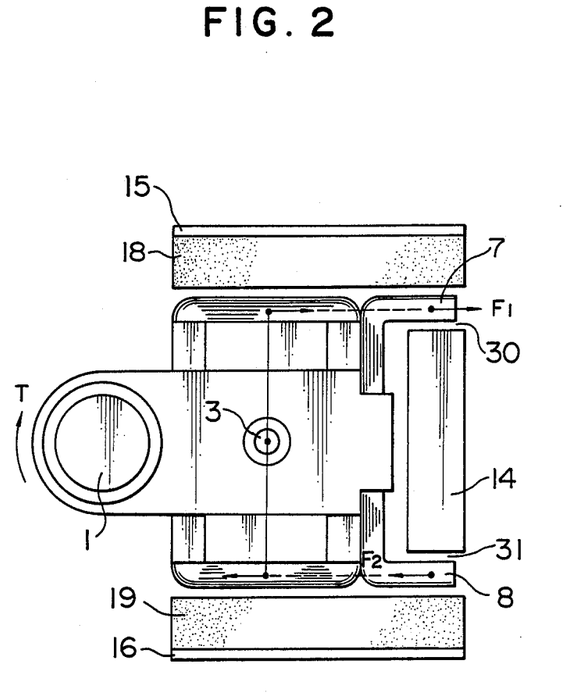
FIG. 2 is a plan view of the embodiment shown in FIG. 1.

FIG. 1 is an exploded perspective view showing the structure of an embodiment of the objective lens driving device of the present invention, and FIG. 2 is a plan view of the embodiment shown in FIG. 1.

Referring to FIGS. 1 and 2, an objective lens 1 is inserted in and fixed to a front end portion of a rocker arm 2. This rocker arm 2 is made of a light-weight and high-rigidity non-magnetic material such as alumimum. A bearing 3 is fixed in a cylindrical hole of the rocker arm 2. This bearing 3 makes sliding engagement with a supporting shaft 11 described later and is also made of a light-weight and high-rigidity non-magnetic material. A coil 6 for driving the objective lens 1 in the axial direction of the supporting shaft 11 described later has the center of its winding registering with the axis of the bearing 3. The coil 6 is fixed to a pair of coil holders 4 and 5 which are fixed to the lower surface of the rocker arm 2. A pair of coils 7 and 8 for driving the objective lens 1 in the rotating direction of the rocker arm 2 are disposed on the side remote from the objective lens 1 relative to the bearing 3 and are spaced apart from each other relative to the rocker arm 2 in the rotating direction of the rocker arm 2. These coils 7 and 8 are each bent at right angles in the middle thereof and are fixed at the central cavities of their windings to respective spools 9 and 10 which are made of a high-rigidity non-magnetic material such as a polycarbonate and are fixed to the rocker arm 2. The axial direction and the rotating direction referred to above will be called a focusing direction and a tracking direction respectively.

The supporting shaft 11 is vertically press-fitted in and fixed to a base plate 17 which is made of a magnetic material such as iron. The supporting shaft 11 is made of a rigid and stable material, and its surface making sliding engagement with the bearing 3 is coated with a resin having a low coefficient of friction. Also fixed to the base plate 17 are a pair of yokes 12 and 13 defining magnetic gaps for driving the objective lens 1 in the focusing direction and a yoke 14 defining magnetic gaps for driving the objective lens 1 in the tracking direction.

Yokes 15 and 16 are used in common to drive the objective lens 1 in both the focusing direction and the tracking direction and are formed by bending both marginal edges of the base plate 17. Magnets 18 and 19 are fixed to the inner surface of the yokes 15 and 16 respectively. These yokes 15 and 16 may not be formed as integral parts of the base plate 17, but may be separately prepared and fixed to the base plate 17.

Magnetic gaps 30 and 31 are formed between the magnet 18 and the yoke 14 and between the magnet 19 and the yoke 14 respectively, and the tracking-direction driving coils 7 and 8 are inserted in these magnetic gaps 30 and 31 respectively.

The tracking-direction driving coils 7 and 8 act also as a counterweight for the objective lens 1. Therefore, these coils 7 and 8 are located on the side remote from the objective lens 1 relative to the bearing 3. Also, the line connecting these coils 7 and 8 is orthogonal with respect to the line connecting the center of the objective lens 1 with that of the bearing 3.

The principle of driving the objective lens 1 in the tracking direction in the embodiment shown in FIGS. 1 and 2 will now be described.

When current is supplied to the tracking-direction driving coils 7 and 8 so that electromagnetic forces $F_1$ and $F_2$ produced in these coils 7 and 8 have directions opposite to each other as shown in FIG. 2, the electromagnetic forces $F_1$ and $F_2$ act as a couple of forces tending to rotate the objective lens 1 in a direction as shown by the arrow T. Since the electromagnetic forces $F_1$ and $F_2$ have the same magnitude but are directed in the opposite directions, no force tending to move the objective lens 1 in the straightforward direction is generated. Thus, when the center of gravity of the movable part registers with the axis of the bearing 3, the movable part rotates around the axis of the bearing 3, and no force acts between the bearing 3 and the supporting shaft 11. Since the driving coils 7 and 8 act also as a counterweight for the objective lens 1 as described above, there is no need to especially provide such a counterweight. Therefore, the weight of the movable part is light, and the acceleration per unit current can be increased in both the focusing direction and the tracking direction. Also, since the dimension of the movable part in the direction of the line connecting the center of the objective lens 1 with that of the bearing 3 is decreased, the rigidity of the movable part can be increased, and the amplitudes of high frequency oscillations generated in the respective directions by the alternating current supplied to the focusing-direction driving coil 6 and to the tracking-direction driving coils 7 and 8 can be decreased. Therefore, positioning control up to the high frequencies can be attained to improve the accuracy of positioning the objective lens 1 in both the focusing direction and the tracking direction.

In the embodiment shown in FIGS. 1 and 2, the yokes 15, 16 and the magnets 18, 19 are integrally combined respectively to be used in common to drive the objective lens 1 in both the focusing direction and the tracking direction. Therefore, this embodiment is advantageous in that the efficiency of the magnetic circuits can be improved, and the costs of machining and assembling can be reduced.

Further, in the embodiment shown in FIGS. 1 and 2, the directions of the electromagnetic forces produced by the coils 7 and 8 driving the objective lens 1 in the tracking direction are orthogonal with respect to the moving direction of the objective lens 1. Therefore, even when there is an unbalance between the electromagnetic forces produced by these driving coils 7 and 8, the positioning control in the tracking direction of the objective lens 1 is not adversely affected by such an unbalance, because a force tending to move the movable part in the straightforward direction acts in a direction orthogonal with respect to the tracking direction of the objective lens 1.

Figure 3:
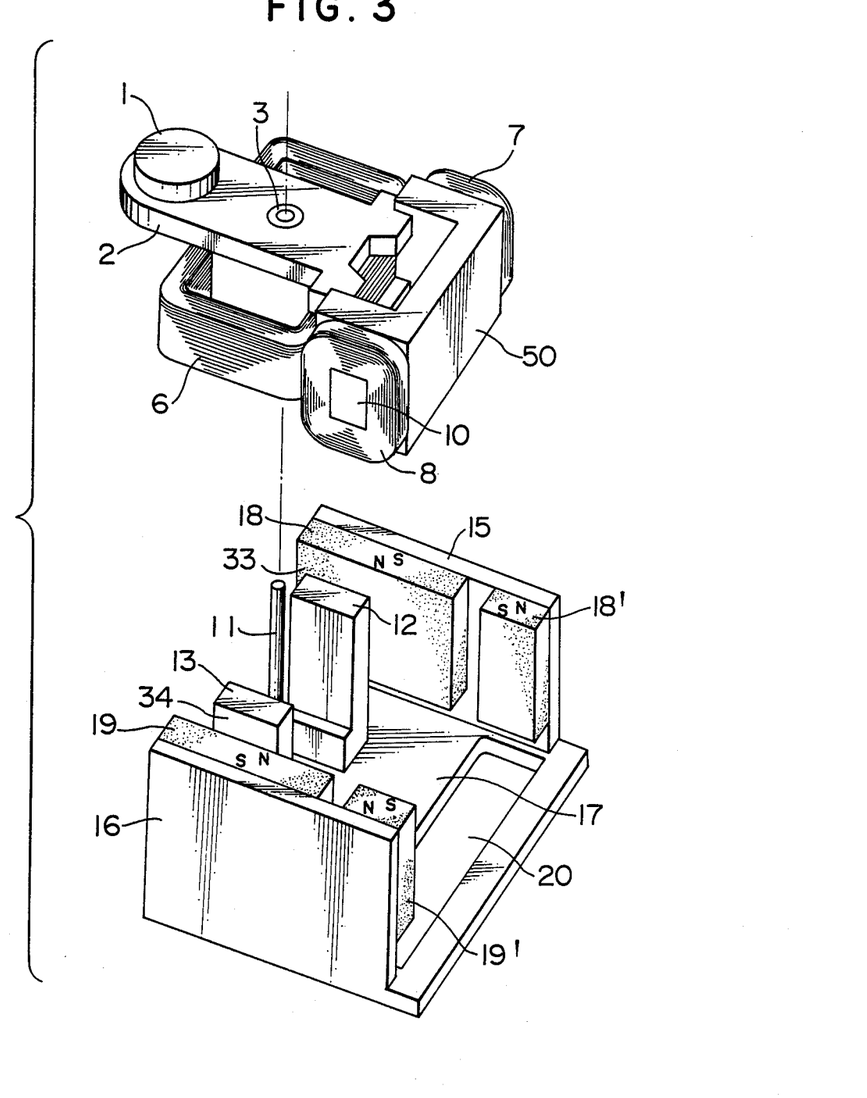
FIG. 3 is an exploded perspective view of another embodiment of the present invention.
Figure 4:
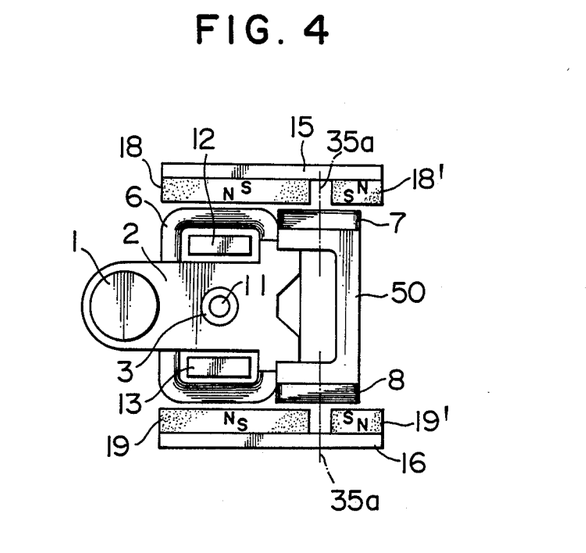
FIG. 4 is a plan view of the embodiment shown in FIG. 3.
Figure 5:
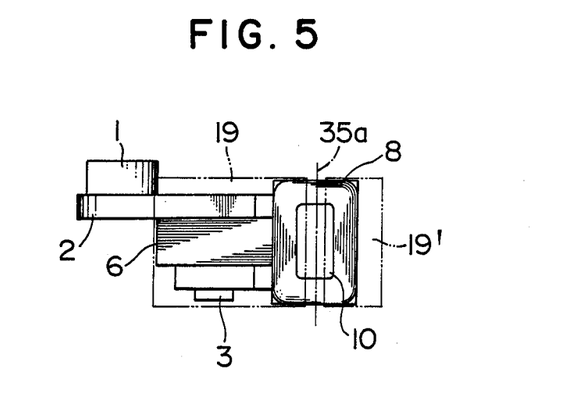
FIG. 5 is a front elevation view of the embodiment shown in FIG. 3.
Figure 6:
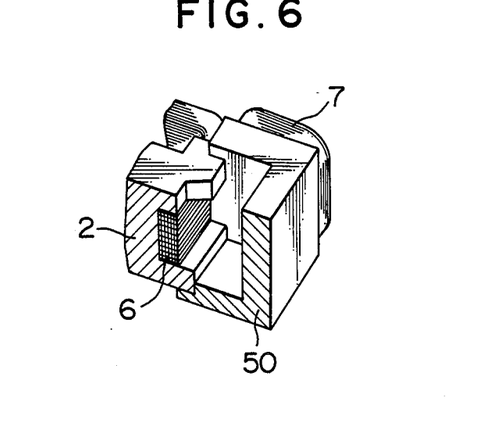
FIG. 6 is a sectional perspective view of a rear portion of the rocker arm shown in FIG. 3.

Another embodiment of the objective lens driving device according to the present invention will be described with reference to FIG. 3 which is an exploded perspective view of the embodiment, FIG. 4 which is a plan view of FIG. 3, FIG. 5 which is a front elevation view of FIG. 3, and FIG. 6 which is a sectional perspective view of a rear portion of the rocker arm shown in FIG. 3. In FIGS. 3 to 6, like reference numerals are used to designate like parts appearing in FIGS. 1 and 2.

Referring to FIGS. 3 to 6, an objective lens 1 is inserted in and fixed to one end portion (a front end portion) of a rocker arm 2. This rocker arm 2 is made of a light-weight and high-rigidity non-magnetic material such as aluminum. A bearing 3 is fixed in a cylindrical hole of the rocker arm 2. This bearing 3 makes sliding engagement with a supporting shaft 11 described later and is also made of a light-weight and high-rigidity non-magnetic material. A coil 6 for driving the objective lens 1 in the focusing direction has the center of its winding registering with the axis of the bearing 3 and is fixed to a bobbin formed on the lower surface of the rocker arm 2. A pair of coils 7 and 8 for driving the objective lens 1 in the tracking direction are disposed on the side remote from the objective lens 1 relative to the bearing 3 and are spaced apart from each other in the tracking direction. These coils 7 and 8 are fixed to spools 9 and 10 which are mounted on both side walls or end plates respectively of a tracking-coil holder 50 and are made of a high-rigidity plastic material such as a polycarbonate reinforced with glass fibers. The tracking-coil holder 50 is fixed to the rear end of the rocker arm 2, that is the end remote from the objective lens 1 relative to the bearing 3, by being press-fitted with extensions of the upper and lower surfaces of the rocker arm 2, as best shown in FIG. 6. The upper and lower extensions of the rocker arm 2 have a rigidity large enough to transmit electromagnetic forces produced by the tracking-direction driving coils 7 and 8 to the rocker arm 2. These upper and lower extensions act also as an upper retainer and a lower retainer for retaining the focusing-direction driving coil 6.

The supporting shaft 11 is vertically press-fitted in and fixed to a base plate 17 which is made of a magnetic material such as iron. The supporting shaft 11 is made of a material having a high rigidity, and its surface making sliding engagement with the bearing 3 is coated with a resin having a low coefficient of friction. Provided on the base plate 17 are a pair of yokes 12, 13 and another pair of yokes 15, 16. Magnets 18 and 18' are fixed to the inner surface of the yoke 15 in a spaced apart relation, and similar magnets 19 and 19' are also fixed to the inner surface of the yoke 16 at position opposite to the magnets 18 and 18' respectively. The magnets 18, 19, the yokes 15, 16 and the yokes 12, 13 cooperate to define respective magnetic gaps 33 and 34 for driving the objective lens 1 in the focusing direction. The yokes 15, 16 and the magnets 18, 18' 19, 19' cooperate to establish magnetic fields for driving the objective lens 1 in the tracking direction. The focusing-direction driving coil 6 is inserted in the magnetic gaps 33 and 34. Since the magnetic flux density tends to be saturated at the lower part of the yokes 12 and 13, the thickness of the lower part of each of these yokes 12 and 13 is increased to prevent saturation of the magnetic flux density. The width of the lower part of the rocker arm 2 is decreased to avoid interference with the thickened parts of the yokes 12 and 13. As shown in FIGS. 4 and 5, the tracking-direction driving coils 7 and 8 are disposed opposite to each other while partly straddling the magnets 18, 18' and the magnets 19, 19' respectively. The magnets 18 and 19 have polarities as shown, for example, in FIGS. 3 and 4, so that a force for driving the objective lens 1 in the focusing direction can be produced by the focusing-direction driving coil 6. Also, the magnets 18 and 18' have opposite polarities so that a force for driving the objective lens 1 in the tracking direction can be produced by the tracking-direction driving coil 7. Similarly, the magnets 19 and 19' have opposite polarities. The tracking-direction driving coil 7 is so arranged that its portions opposed by the magnets 18 and 18' have substantially the same size. The magnet 18, the yoke 15 and the magnet 18' are so sized that the magnetic flux density distribution is inversely symmetrical with respect to the symmetry plane 35a of the tracking-direction driving coil 7. The same applies also to the other tracking-direction driving coil 8.

Figure 7:
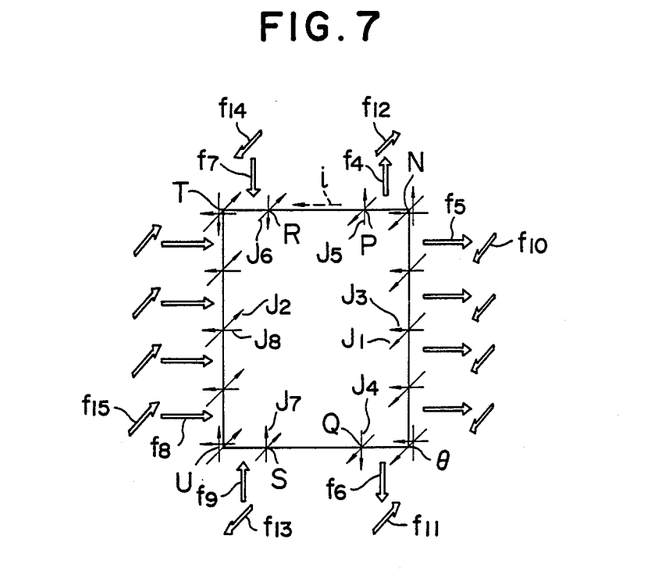
FIGS. 7 and 8 illustrate the operation of the embodiment shown in FIG. 3.
Figure 8:
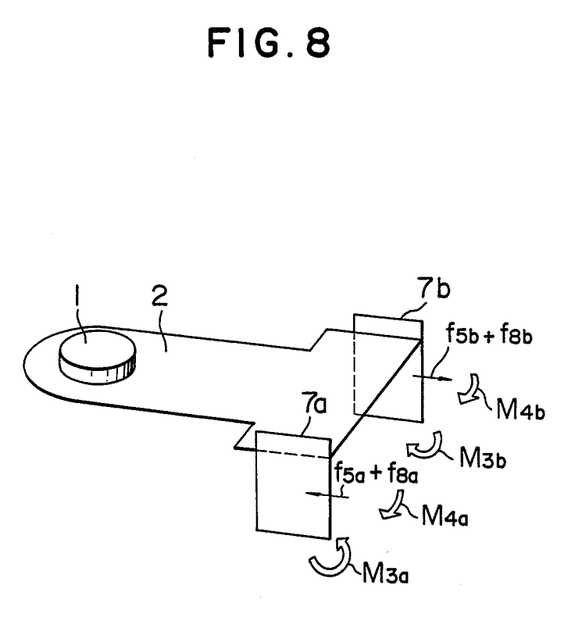

The tracking-direction driving coils 7 and 8 act also as a counterweight for the objective lens 1. Therefore, these coils 7 and 8 are located on the side remote from the objective lens 1 relative to the bearing 3, that is, adjacent to the rear end of the rocker arm 2. Also, these coils 7 and 8 are disposed in spaced apart relation on a line orthogonal with respect to the line connecting the center of the objective lens 1 with that of the bearing 3. In this embodiment, the magnetic fields near the tracking-direction driving coils 7 and 8 are not perpendicular with respect to the planes of the coils 7 and 8 but are inclined. Effective components of the magnetic flux density on the central section of the coil 7 are designated by $J_1$ to $J_8$ in FIG. 7. Forces produced at various portions of the coil 7 when current i is supplied to the coil 7 are $f_4$ and $f_{12}$ between points P and N on the upper side; $f_7$ and $f_{14}$ between points T and R on the upper side; $f_5$ and $f_{10}$ between points N and O on the right side; $f_8$ and $f_{15}$ between points T and U on the left side; $f_6$ and $f_{11}$ between points O and Q on the lower side; and $f_9$ and $f_{13}$ between points S and U on the lower side. The forces $f_5$ and $f_8$ have the same direction, and the sum provides a single resultant force. The forces $f_6$, $f_9$ and the forces $f_4$, $f_7$ provide moments of rotation in opposite directions respectively, and the axis is the tracking direction. The composite of these moments is called $M_3$ herein. On the other hand, the forces $f_{11}$, $f_{13}$ and the forces $f_{12}$ and $f_{14}$ provide moments of rotation around the axis of the supporting shaft 11, that is, moments of counter-clockwise rotation when viewed from above, while the forces $f_{10}$ and $f_{15}$ provide moments of clockwise rotation around the same axis. The composite of these moments is called $M_4$ herein. The shape of the coil 7 is generally such that the longitudinal side N-O is longer than the lateral side U-O. Therefore, the clockwise component is larger than the counter-clockwise component, and the predominant composite moment is the moment of clockwise rotation. On the other hand, in the case of the tracking-direction driving coil 8, the magnetic field has a polarity opposite to that of the coil 7, but the direction of coil current is the same as that of the coil 7. Therefore, the tracking-direction driving coils 7 and 8 produce an arm driving force as shown in FIG. 8. Referring to FIG. 8, the directions of moments of rotation provided by forces $f_{5a}+f_{8a}$ and forces $f_{5b}+f_{8b}$ are the same as those of moments of rotation $M_{4a}$ and $M_{4b}$. Thus, it can be seen that the moments of rotation $M_{4a}$ and $M_{4b}$ are effective for increasing the arm driving force. On the other hand, moments of rotation $M_{3a}$ and $M_{3b}$ have opposite directions. Therefore, when the rigidity of the rocker arm 2, tracking-direction driving coils 7, 8 and coil holder 50 is sufficiently large, no force tending to cause displacement of the rocker arm 2 is imparted. Thus, according to the embodiment described with reference to FIGS. 3 to 8, the driving force imparted to the rocker arm 2 is provided only by the moments of rotation around the axis of the supporting shaft 11, and no force causing resonance of the supporting shaft 11 is imparted thereto.

The tracking-direction driving coils 7 and 8 are fixed to the end plates respectively of the coil holder 50 as seen in FIG. 3. Further, as seen in FIG. 6, on the side remote from the side joined to the rocker arm 2, the end plates of the coil holder 50 having the tracking-direction driving coils 7 and 8 fixed thereto are connected to each other by a connection plate having a sufficient thickness. Also, as seen in FIG. 6, a bottom plate connected to the connection plate and to the lower ends of the end plates having the coils 7 and 8 fixed thereto is joined to one end of the rocker arm 2. Therefore, even when, for example, the driving forces $f_5+f_8$ may be imparted to the tracking-direction driving coils 7 and 8, these coils 7 and 8 would not be appreciably deformed. Thus, the rocker arm 2 can be driven up to a high frequency range so that the position of the objective lens 1 can be controlled with high accuracy.

A slot 20 is preferably formed in the base plate 17 in an area beneath the magnets 18' and 19' provided for establishing the magnetic fields for driving the objective lens 1 in the tracking direction, as shown in FIG. 3. The provision of such a slot 20 is effective in that the portions of the magnetic fields at the lower parts of the coils 7 and 8 can be directed in a direction orthogonal with respect to the coils 7 and 8, and the magnetic flux density can be increased.

Further, the density of the magnetic flux produced by the magnets 18' and 19' can be increased by increasing the dimension of the magnets 18' and 19' in the focusing direction.

It will be understood from the foregoing detailed description of the present invention that the forces produced by the coils driving the objective lens in the tracking direction provide moments of rotation around the supporting shaft, and no radial force is imparted to the supporting shaft. Therefore, friction and vibration that may be imparted to the bearing of the supporting shaft can be reduced to improve the accuracy of positioning the objective lens in both the focusing direction and the tracking direction.

We claim:

1. An objective lens driving device comprising:

a supporting shaft erected on a base plate;

a pair of yokes erected on said base plate on both sides of said supporting shaft in a relation spaced apart from said supporting shaft;

a pair of magnets mounted to said yokes respectively;

a rocker arm supported by said supporting shaft so as to be rotatable around the axis of said supporting shaft and movable in the axial direction of said supporting shaft;

an objective lens mounted on said rocker arm at an end portion which is a front portion relative to said supporting shaft;

coil means for driving said objective lens in the rotating direction of said rocker arm including only one pair of first coils, said first coils being disposed on both sides respectively of an end portion of said rocker arm which is a rear portion relative to said supporting shaft;

a second coil mounted to the lower surface of said rocker arm with the center of the winding thereof registering substantially with the axis of said supporting shaft so as to drive said objective lens in the axial direction of said supporting shaft;

means for supplying current to the pair of said first coils to generate electromagnetic forces in said first coils in directions opposite to each other for producting moments of rotation tending to rotate said rocker arm around the axis of said supporting shaft thereby driving said objective lens in the rotating direction of said rocker arm; and means for supplying current to said second coil to move said rocker arm in the axial direction of said supporting shaft thereby driving said objective lens in the axial direction of said supporting shaft.

2. An objective lens driving device as claimed in claim 1, wherein the pair of said yokes are formed as integral parts of said base plate.

3. An objective lens driving device as claimed in claim 1, wherein the pair of said first coils are each bent at right angles in the middle thereof and are mounted at the bent portions to the side surfaces respectively of the rear end portion of said rocker arm.

4. An objective lens driving device as claimed in claim 1, wherein a coil holder is joined to the rear end portion of said rocker arm, and said first coils are mounted to the side surfaces respectively of said coil holder.

5. An objective lens driving device as claimed in claim 1, wherein said rocker arm is made of a non-magnetic material.

6. An objective lens driving device as claimed in claim 1, wherein each of the pair of said magnets mounted to the pair of said yokes respectively includes a first magnet producing a magnetic field having at least a component for driving said objective lens in the axial direction of said supporting shaft and a component for driving said objective lens in the rotating direction of said rocker arm, and a second magnetic spaced apart from said first magnet and disposed nearer to the associated one of said first coils.

7. An objective lens driving device comprising:

a supporting shaft erected on a front end portion of a base plate;

a pair of first yokes erected on said base plate on both sides of said supporting shaft in a relation spaced apart from said supporting shaft;

a pair of second yokes erected on said base plate on both sides of said supporting shaft and outside of the pair of said first yokes in a relation spaced apart from said first yoke pair;

a pair of magnets mounted to the pair of said second yokes respectively;

a rocker arm supported by said supporting shaft so as to be rotatable around the axis of said supporting shaft and movable in the axial direction of said supporting shaft;

an objective lens mounted on a front end portion of said rocker arm;

a pair of first coils disposed opposite to said magnets on both sides of a rear end portion of said rocker arm respectively so as to drive said objective lens in the rotating direction of said rocker arm;

a second coil mounted to the lower surface of said rocker arm with the center of the winding thereof registering substantially with the axis of said supporting shaft, said second coil being inserted in air gaps defined between said first yoke pair and said second yoke pair;

means for supplying current to the pair of said first coils to produce moments of rotation tending to rotate said rocker arm around the axis of said supporting shaft thereby driving said objective lens in the rotating direction of said rocker arm; and means for supplying current to said second coil to move said rocker arm in the axial direction of said supporting shaft thereby driving said objective lens in the axial direction of said supporting shaft.

8. An objective lens driving device as claimed in claim 7, wherein the pair of said second yokes are formed by bending portions of said base plate.

9. An objective lens driving device as claimed in claim 7, wherein the pair of said first coils are each bent at right angles in the middle thereof and are mounted at the bent portions to the side surface respectively of the rear end of said rocker arm.

10. An objective lens driving device as claimed in claim 7, wherein a coil holder is joined to the rear end portion of said rocker arm, and said first coils are mounted to the side surfaces respectively of said coil holder.

11. An objective lens driving device as claimed in claim 7, wherein said rocker arm is made of a non-magnetic material.

12. An objective lens driving device as claimed in claim 7, wherein each of the pair of said magnets mounted to the pair of said second yokes respectively includes a first magnet producing a magnetic field having at least a component for driving said objective lens in the axial direction of said supporting shaft and a component for driving said objective lens in the rotating direction of said rocker arm, and a second magnet spaced apart from said first magnet and disposed nearer to the associated one of said first coils.

13. An objective lens driving device as claimed in claim 1, wherein said pair of yokes and said pair of magnets mounted to said yokes are disposed on opposite sides of said rocker arm.

14. An objective lens driving device as claimed in claim 13, wherein said pair of yokes and said pair of magnets mounted thereon are arranged on opposite sides of said rocker arm proximate to the rear end portion of said rocker arm and spaced from the front end portion of said rocker arm.

15. An objective lens driving device as claimed in claim 1, wherein said coil means for driving said objective lens in the rotating direction of said rocker arm provides a counterweight for said objective lens.

* * * * *